(12) United States Patent
Wang et al.

(10) Patent No.: US 11,127,964 B2
(45) Date of Patent: Sep. 21, 2021

(54) METHOD FOR PREPARING A POROUS POLYIMIDE FILM AND A COMPOSITE MEMBRANE COMPRISING THE SAME

(75) Inventors: Xin Wang, Singapore (SG); Tien Hoa Nguyen, Singapore (SG)

(73) Assignee: Nanyang Technological University, Singapore (SG)

( * ) Notice: Subject to any disclaimer, the term of this patent is extended or adjusted under 35 U.S.C. 154(b) by 556 days.

(21) Appl. No.: 13/193,143

(22) Filed: Jul. 28, 2011

(65) Prior Publication Data
US 2012/0028167 A1    Feb. 2, 2012

Related U.S. Application Data

(60) Provisional application No. 61/368,460, filed on Jul. 28, 2010.

(51) Int. Cl.
*H01M 8/103* (2016.01)
*C08G 73/10* (2006.01)
(Continued)

(52) U.S. Cl.
CPC .......... *H01M 8/103* (2013.01); *C08G 73/105* (2013.01); *C08G 73/1042* (2013.01);
(Continued)

(58) Field of Classification Search
CPC .. H01M 8/103; H01M 8/1048; H01M 8/1072; H01M 8/1051; H01M 8/1067; H01M 8/1081; H01M 8/1023; H01M 8/1027; H01M 8/1044; H01M 8/1025; H01M 8/1039; H01M 8/106;
(Continued)

(56) References Cited

U.S. PATENT DOCUMENTS

| 4,240,914 A | * | 12/1980 | Iwama | B01D 71/64 |
| | | | | 210/500.23 |
| 4,378,324 A | * | 3/1983 | Makino | B01D 71/64 |
| | | | | 210/500.39 |
| 2005/0238896 A1 | * | 10/2005 | Itoh | B32B 15/08 |
| | | | | 428/473.5 |

FOREIGN PATENT DOCUMENTS

EP    2 354 180 A1    8/2011

OTHER PUBLICATIONS

Dunson, "Synthesis and Characterization of Thermosetting Polyimide Oligomers for Microelectronics Packaging," Dissertation Virginia Polytechnic Institute and State University, Apr. 21, 2000. (Year: 2000).*

(Continued)

*Primary Examiner* — Kara B Boyle
(74) *Attorney, Agent, or Firm* — Alston & Bird LLP

(57) ABSTRACT

The present invention relates to a method for preparing a porous polyimide film, comprising reacting an aromatic dianhydride with one or more aromatic diamines in a suitable solvent to form poly(amic acid), adding a dehydrated agent of an acid anhydride and an organic base to the reaction mixture to convert the poly(amic acid) to a polyimide precursor, casting the reaction mixture comprising the polyimide precursor onto a solid support to form a film, coagulating the polyimide precursor in a coagulating bath comprising a mixture of a solvent and a non-solvent to develop a porous structure, and drying the coagulated polyimide precursor in air to form the porous polyimide film. A composite membrane comprising same and its use are also provided.

15 Claims, 8 Drawing Sheets

(51) Int. Cl.
| | |
|---|---|
| H01M 8/1048 | (2016.01) |
| H01M 8/1072 | (2016.01) |
| H01M 8/1051 | (2016.01) |
| H01M 8/1067 | (2016.01) |
| H01M 8/1081 | (2016.01) |
| H01M 8/1023 | (2016.01) |
| H01M 8/1027 | (2016.01) |
| H01M 8/1044 | (2016.01) |
| H01M 8/1025 | (2016.01) |
| H01M 8/1039 | (2016.01) |
| H01M 8/106 | (2016.01) |
| H01M 8/1062 | (2016.01) |
| H01M 8/1032 | (2016.01) |

(52) U.S. Cl.
CPC ..... *C08G 73/1067* (2013.01); *C08G 73/1071* (2013.01); *H01M 8/106* (2013.01); *H01M 8/1023* (2013.01); *H01M 8/1025* (2013.01); *H01M 8/1027* (2013.01); *H01M 8/1032* (2013.01); *H01M 8/1039* (2013.01); *H01M 8/1044* (2013.01); *H01M 8/1048* (2013.01); *H01M 8/1051* (2013.01); *H01M 8/1062* (2013.01); *H01M 8/1067* (2013.01); *H01M 8/1072* (2013.01); *H01M 8/1081* (2013.01); *Y02P 70/50* (2015.11)

(58) Field of Classification Search
CPC .............. H01M 8/1062; H01M 8/1032; C08G 73/1067; C08G 73/1042; C08G 73/1071; C08G 73/105; Y02P 70/50; Y02E 60/50
See application file for complete search history.

(56) References Cited

OTHER PUBLICATIONS

Nguyen, T., et al; "Fabrication of the porous polyimide film as a matrix of the composite membrane of the direct methanol fuel cell"; Separation and Purification Technology; vol. 67; 2009; pp. 208-212

Nguyen, T., et al.; "Multifunctional composite membrane based on a highly porous polyimide matrix for direct methanol fuel cells"; Journal of Power Sources; vol. 195; 2010; pp. 1024-1030

* cited by examiner

METHOD FOR PREPARING A POROUS POLYIMIDE FILM AND A COMPOSITE MEMBRANE COMPRISING THE SAME

CROSS-REFERENCE TO RELATED APPLICATION

This application claims the benefit of priority of U.S. Provisional Patent Application No. 61/368,460, filed 28 Jul. 2010, the contents of which being hereby incorporated by reference in its entirety for all purposes.

TECHNICAL FIELD

The invention relates to a method for preparing a porous polyimide film and a composite membrane comprising the same.

BACKGROUND

Direct methanol fuel cells (DMFCs) are promising power sources for various portable applications, such as laptop computers and mobile phones, because of their advantages of low weight and high specific energy compared with batteries. As a key component in a DMFC, the membrane ought to fulfill the following requirements simultaneously before successful commercialization can be realized: high proton conductivity, low methanol crossover and high mechanical strength. Numerous efforts have been made to modify Nafion-based polymers or synthesize alternative polymer-based membranes, with the aim of developing membranes with reduced methanol crossover while still maintaining high proton conductivity and mechanical strength. Most of the results show a certain level of reduction in methanol crossover. On the other hand, the proton conductivity and mechanical strength are also sacrificed to certain degree, which limits their use in real situations. To date, there have been no reports of the successful application of new membranes in practical DMFC applications.

One solution to this problem is to fabricate a polymer matrix and then fill it with a proton-conducting polymer. The rigid structure of the matrix will limit the swelling of the added electrolyte and consequently will reduce the methanol crossover. The high mechanical strength of the matrix also offers the possibility of fabricating a very thin structure to reduce the resistance of the membrane in operation.

Various substrates have been attempted, e.g., polytetrafluoroethylene (PTFE), porous silica, crosslinked polyethylene (CLPE), and commercial porous polyimide (PI). Unfortunately, performance of DMFCs based on these types of membranes is either lacking or not satisfactory, mainly because of the difficulty to fill completely the porous substrate to form a workable membrane with sufficient proton conductivity and mechanical strength.

Therefore, there is a need to provide for a composite membrane that overcomes, or at least alleviates, the above problem.

SUMMARY

In a first aspect, a method for preparing a porous polyimide film is provided. The method may include:
(a) reacting an aromatic dianhydride with one or more aromatic diamines in a suitable solvent to form poly(amic acid)
(b) adding a dehydrated agent of an acid anhydride and an organic base to the reaction mixture to convert the poly(amic acid) to a polyimide precursor;
(c) casting the reaction mixture of (b) comprising the polyimide precursor onto a solid support to form a film;
(d) coagulating the polyimide precursor in a coagulating bath comprising a mixture of a solvent and a non-solvent to develop a porous structure; and
(e) drying the coagulated polyimide precursor in air to form the porous polyimide film.

In a further aspect, the present invention is directed to a porous polyimide film being obtained or obtainable by the methods of the invention.

In another aspect, there is provided a method for preparing a composite membrane. The method may include:
(a) providing a porous polyimide film prepared by a method of the invention;
(b) exposing the polyimide film to a solution of electrolyte; and
(c) heating the polyimide film of (b) to form the composite membrane.

In a further aspect, the present invention is directed to a composite membrane being obtained or obtainable by the methods of the invention.

In yet further aspect, the present invention is directed to use of the present composite membrane in a fuel cell.

In another aspect, a fuel cell comprising the present composite membrane is provided.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

DESCRIPTION

Figure 1:
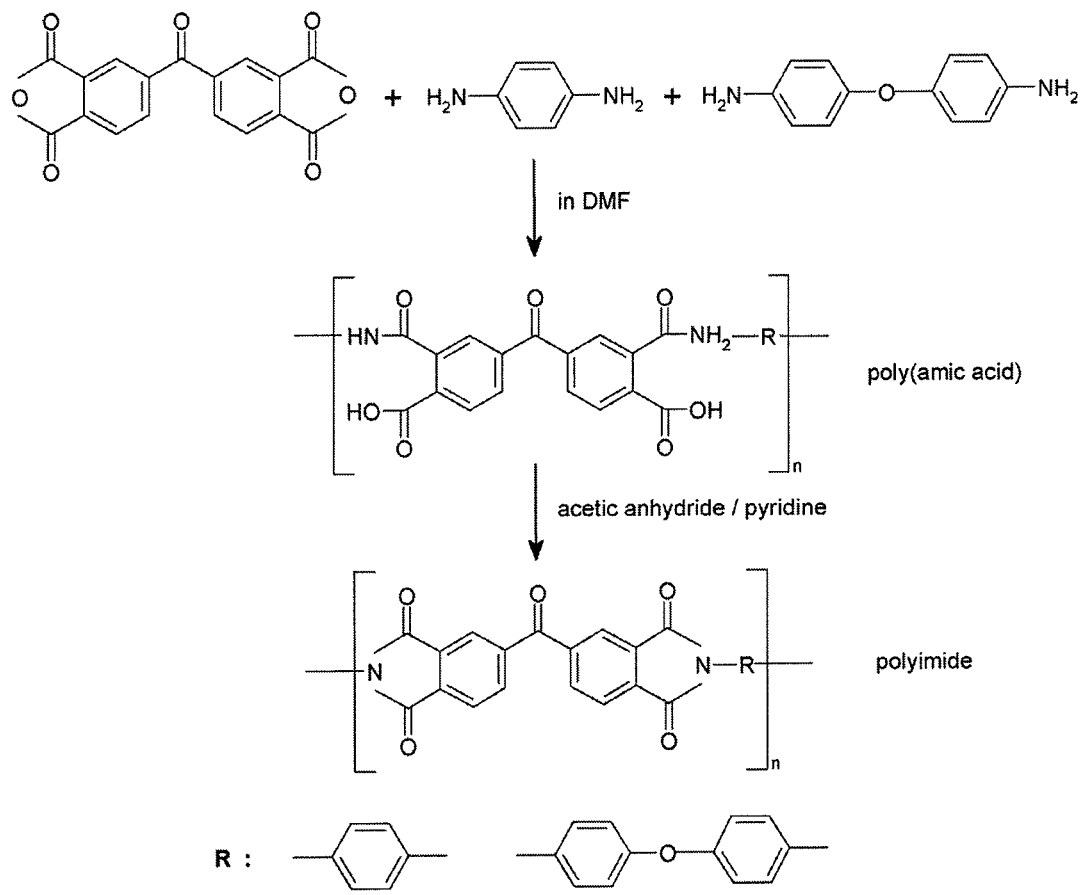
FIG. 1 shows co-polyimide synthesis scheme based on Example 1.

The following detailed description refers to the accompanying drawings that show, by way of illustration, specific details and embodiments in which the invention may be practised. These embodiments are described in sufficient detail to enable those skilled in the art to practise the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

The present invention in a first aspect relates to a method for preparing a porous polyimide film. In various embodiments, the method includes reacting an aromatic dianhydride with one or more aromatic diamines in a suitable solvent to form poly(amic acid).

In various embodiments, the polyimide film has the chemical formula (I)

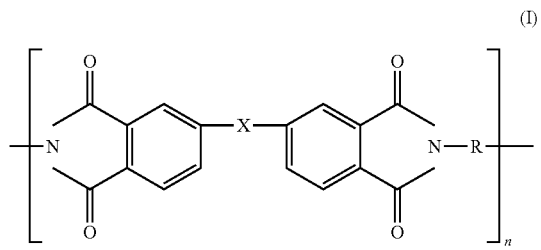

wherein X is selected from the group consisting of a direct bond, substituted or unsubstituted straight-chain or branched $C_1$-$C_{10}$ alkyl, substituted or unsubstituted straight-chain or branched $C_2$-$C_{10}$ alkenyl, substituted or unsubstituted straight-chain or branched $C_2$-$C_{10}$ alkynyl, substituted or unsubstituted $C_3$-$C_{10}$ cycloalkyl, substituted or unsubstituted $C_3$-$C_{10}$ heterocycloalkyl, substituted or unsubstituted $C_6$-$C_{10}$ aryl, and a heteroatom selected from oxygen, sulfur and nitrogen, R is a substituted or unsubstituted $C_6$-$C_{20}$ aryl, and n is an integer of at least 20.

In various embodiments, the poly(amic acid) has the chemical formula (II)

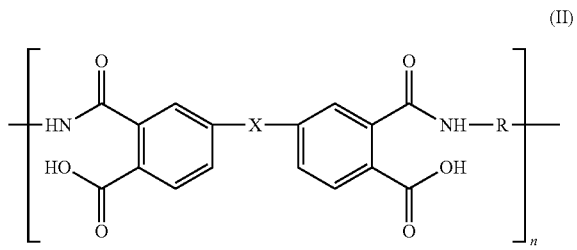

and is obtained by the reaction between an aromatic dianhydride of chemical formula (III)

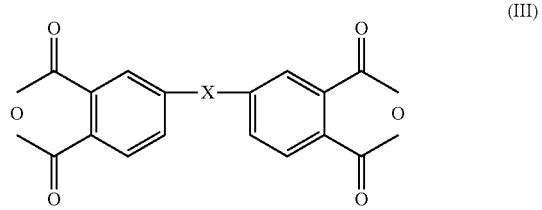

wherein X is selected from the group consisting of a direct bond, substituted or unsubstituted straight-chain or branched $C_1$-$C_{10}$ alkyl, substituted or unsubstituted straight-chain or branched $C_2$-$C_{10}$ alkenyl, substituted or unsubstituted straight-chain or branched $C_2$-$C_{10}$ alkynyl, substituted or unsubstituted $C_3$-$C_{10}$ cycloalkyl, substituted or unsubstituted $C_3$-$C_{10}$ heterocycloalkyl, substituted or unsubstituted $C_6$-$C_{10}$ aryl, and a heteroatom selected from oxygen, sulfur and nitrogen, with at least one aromatic diamine of chemical formula (IV)

$$H_2N-R-NH_2 \qquad (IV)$$

wherein R is a substituted or unsubstituted $C_6$-$C_{20}$ aryl.

The term "substituted or unsubstituted straight-chain or branched $C_1$-$C_{10}$ alkyl" refers to a fully saturated aliphatic hydrocarbon. Whenever it appears here, a numerical range, such as 1 to 10 or $C_1$-$C_{10}$ refers to each integer in the given range, e.g. it means that an alkyl group comprises only 1 carbon atom, 2 carbon atoms, 3 carbon atoms etc. up to and including 10 carbon atoms. Examples of alkyl groups may be, but are not limited to, methyl, ethyl, n-propyl, isopropyl, n-butyl, isobutyl, s-butyl, t-butyl, n-hexyl, n-heptyl, n-octyl, n-nonyl or n-decyl and the like. Exemplary substituents include $C_1$-$C_{10}$ alkoxy, $C_5$-$C_{10}$ aryl, $C_5$-$C_{10}$ aryloxy, sulfhydryl, $C_5$-$C_{10}$ arylthio, halogen, hydroxyl, amino, sulfonyl, carbonyl, nitro, cyano, and carboxyl.

The term "substituted or unsubstituted straight-chain or branched $C_2$-$C_{10}$ alkenyl" refers to an aliphatic hydrocarbon having one or more carbon-carbon double bonds. Examples of alkenyl groups may be, but are not limited to, ethenyl, propenyl, allyl or 1,4-butadienyl and the like. Exemplary substituents include $C_1$-$C_{10}$ alkoxy, $C_5$-$C_{10}$ aryl, $C_5$-$C_{10}$ aryloxy, sulfhydryl, $C_5$-$C_{10}$ arylthio, halogen, hydroxyl, amino, sulfonyl, carbonyl, nitro, cyano, and carboxyl.

The term "substituted or unsubstituted straight-chain or branched $C_2$-$C_{10}$ alkynyl" refers to an aliphatic hydrocarbon having one or more carbon-carbon triple bonds. Examples of alkynyl groups may be, but are not limited to, ethynyl, propynyl, butynyl, and the like. Exemplary substituents include $C_1$-$C_{10}$ alkoxy, $C_5$-$C_{10}$ aryl, $C_5$-$C_{10}$ aryloxy, sulfhydryl, $C_5$-$C_{10}$ arylthio, halogen, hydroxyl, amino, sulfonyl, carbonyl, nitro, cyano, and carboxyl.

The term "substituted or unsubstituted $C_3$-$C_{10}$ cycloalkyl" refers to a group comprising a non-aromatic ring (i.e. an alicyclic ring) wherein each of the atoms forming the ring is a carbon atom. The $C_3$-$C_{10}$ cycloalkyl may be formed by three, four, five, six, seven, eight, nine, or ten carbon atoms. Examples of $C_3$-$C_{10}$ cycloalkyl include cyclopropane, cyclobutane, cyclopentane, cyclohexane, cycloheptane, among others. Exemplary substituents include $C_1$-$C_{10}$ alkoxy, $C_5$-$C_{20}$ aryl, $C_5$-$C_{20}$ aryloxy, sulfhydryl, $C_5$-$C_{20}$ arylthio, halogen, hydroxyl, amino, sulfonyl, carbonyl, nitro, cyano, and carboxyl.

The term "substituted or unsubstituted $C_3$-$C_{10}$ heterocycloalkyl" has the general above definition of "$C_3$-$C_{10}$ cycloalkyl", except in the alicyclic ring at least one of the carbon atom in the ring is substituted with a heteroatom. Heteroatoms are typically independently selected from oxygen, sulfur, nitrogen, and phosphorus, but are not limited to those atoms. The $C_3$-$C_{10}$ heterocycloalkyl may be formed by three, four, five, six, seven, eight, nine, or ten atoms. Examples of $C_3$-$C_{10}$ heterocycloalkyls include, but are not limited to, lactams, lactones, cyclic imides, cyclic thioimides, cyclic carbamates. Exemplary substituents include alkoxy, aryl, aryloxy, sulfhydryl, arylthio, halogen, hydroxyl, amino, carbonyl and carboxyl.

The term "substituted or unsubstituted $C_6$-$C_{10}$ aryl" refers to an aromatic ring, wherein each of the atoms forming the ring is a carbon atom. Aromatic in this context means a group comprising a covalently closed planar ring having a delocalized π-electron system comprising 4w+2 π-electrons, wherein w is an integer of at least 1, for example 1, 2, 3 or 4. Examples of aryl groups may be, but are not limited to, phenyl, napthalenyl, phenanthrenyl, anthracenyl, tetralinyl, fluorenyl, indenyl, and indanyl, and the like.

The term "heteroatom" refers to an atom other than carbon present in a main chain of a hydrocarbon. For example, a heteroatom may be selected from oxygen, sulfur or nitrogen.

In various embodiments, X is a direct bond or a carbonyl group.

In various embodiments, R is

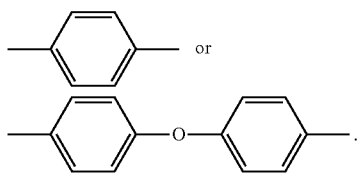

In various embodiments, the aromatic dianhydride is reacted with at least two different aromatic diamines of chemical formula (IV).

In one embodiment, the aromatic dianhydride is benzophenone-3,3',4,4'-tetracarboxylic dianhydride (BTDA) which is reacted with 1,4-phenylenediamine (PPDA) and 4,4'-oxydianiline (ODA). For example, the molar ratio of BTDA to PPDA to ODA may be about 1.0:0.75:0.25 in the reaction mixture.

Poly(amic acid) may be formed in any suitable solvent, such as N,N-dimethylformamide (DMF), tetrahydrofuran, acetone, N-methylpyrrolidone (NMP), N,N-dimethylacetamide, or dimethylsulfoxide. In various embodiments, the solvent is DMF or NMP.

The method further includes adding a dehydrated agent of an acid anhydride and an organic base to the reaction mixture to convert the poly(amic acid) to a polyimide precursor. In various embodiments, the dehydrated agent of the acid anhydride is acetic, propanoic, n-butyric or benzoic acid anhydride. In various embodiments, the organic base is pyridine, triethylamine, or N-methylmorpholine. In one embodiment, acetic anhydride and pyridine are added to the reaction mixture. In various embodiments, the acetic anhydride and pyridine are added in a volume ratio of acetic anhydride:pyridine of between about 5:1 and about 1:1, such as 4:1, 3:1 and 2:1.

In one embodiment, acetic anhydride and pyridine are added in a volume ratio of acetic anhydride:pyridine of about 2:1.

The method includes casting the reaction mixture comprising the polyimide precursor onto a solid support to form a film. The casting may be carried out by any standard casting technique, such as by a spin coating machine. In one embodiment, the reaction mixture is casted on a solid support such as a casting glass plate.

The method also includes coagulating the casted polyimide precursor in a coagulating bath comprising a mixture of a solvent and a non-solvent to develop a porous structure. It has been found that the morphology of the porous polyimide film can be tuned by the solvent and non-solvent used during the pore-forming period. A low compatibility between the solvent and the non-solvent will cause a delayed de-mixing so that the resulted film will consist of a porous top layer and a sponge-type sub-structure. Alternatively, a high affinity between them will cause an instantaneous de-mixing so that the formed membrane will consist of a porous top layer and finger type substructure, commonly called macrovoids. Macrovoid-containing films are mechanically weak and easily lose their integrity under high pressure operation. Preliminary results have shown that a sponge-type structure possesses higher mechanical strength than a finger-type at high porosity. The mixture of solvent and non-solvent is thus carefully selected to favour the formation of a sponge-type structure over a finger-type structure.

In various embodiments, the solvent of the coagulating bath is selected from the group consisting of N,N-dimethylformamide (DMF), tetrahydrofuran, acetone, N-methylpyrrolidone (NMP), N,N-dimethylacetamide, and dimethylsulfoxide.

In various embodiments, the non-solvent of the coagulating bath is substituted or unsubstituted straight-chain or branched $C_1$-$C_{10}$ alcohol, such as, $C_3$-$C_5$ alcohol, for example, 1-butanol.

In one embodiment, the solvent is DMF and the non-solvent is 1-butanol.

The pore size of the porous polyimide film can further be controlled by changing the solvent/non-solvent ratio. The pore size of porous films increases with decrease of the non-solvent content in the coagulation bath. The pores can grow until the matrix phase, polymer-rich phase, is solidified. With lower non-solvent contents, the polymer concentration of the polymer-rich phase is lower. Therefore, there is a longer time before the membrane solidifies and larger pores can develop. To fabricate successfully a pore-filling composite membrane with a high performance, the porous PI matrix preferentially should have pore sizes on the sub-micrometer scale, or less, to suppress efficiently membrane swelling and maintain high mechanical strength. If the pores are too large the blocking of methanol crossover will be less efficient and the mechanical strength of the substrate will usually be lower. If the pores are too small, however, infiltration can be difficult.

In various embodiments, the volume ratio of non-solvent:solvent is between about 5:1 and about 1:1, such as about 4:1, 3:1 and 2:1.

In one embodiment, the volume ratio of non-solvent:solvent is about 7:3.

The overall porosity of a porous PI film can be controlled by the polymer content of the casting solution, as well as by the relative rates at which the non-solvent enters and solvent leaves the casting solution. Moreover, from a thermodynamic standpoint, any additive in the casting solution will be expected to increase the rate of non-solvent entry and decrease the rate of solvent removal, which favours the formation of a film with high porosity. Therefore, the presence of acetic anhydride and pyridine in the polyimide precursor as additives further increases the film porosity.

The method further includes drying the coagulated polyimide precursor in air to form the porous polyimide film. Advantageously, the present method does not require heat treatment to remove all the solvents and to thermally convert all the poly(amic acid) to polyimide. The aged polyimide precursor is simply dried in air for a period of time to obtain the porous polyimide film.

In various embodiments, the aged polyimide precursor is dried in air for more than 1 hour, such as about 6 hours, about 12 hours, about 18 hours, or about 24 hours.

The method optionally includes ageing the coagulated polyimide precursor to further develop the porous structure of the polyimide film and/or complete the pore formation process before drying the film. In one embodiment, a single ageing solution is provided. For example, the ageing solution may be methanol or water. Other ageing solutions suitable for the post non-solvent treatment to complete the pore formation process are also contemplated.

In an alternative embodiment, the ageing may be carried out in a first ageing solution such as methanol, followed by in a second ageing solution such as water.

A highly porous polyimide film with tunable pore size, porosity and thickness as synthesized by the present method may be used as a matrix to construct an electrolyte-infiltrated composite membrane. Accordingly, an efficient way for an easy and complete infiltration of the proton-conducting polymer or electrolyte into the polyimide film to form a composite membrane is developed. Due to the complete inertness to methanol and the high mechanical strength of the polyimide matrix, the swelling of the composite membrane is greatly suppressed and the methanol crossover is also significantly reduced (circa 80 times), whereas while high proton conductivity (comparable with Nafion) and mechanical strength (4 times stronger than Nafion) is still maintained. The present membrane demonstrates significantly improved cell performance compared with the conventional Nafion membrane and is a promising candidate for use in fuel cells, such as direct methanol fuel cells.

In another aspect, there is provided a method for preparing a composite membrane. The method may include providing a porous polyimide film prepared by the present method and exposing the polyimide film to a solution of electrolyte. For example, the polyimide film may be immersed in a solution of the electrolyte. The solution of electrolyte may also be poured over the polyimide film to allow infiltration of the electrolyte into the pores of the porous polyimide film.

Suitable electrolytes include proton-conducting polymers containing sulfonic acid groups such as sulfonated fluorotetraethylene (Nafion), sulfonated poly(etheretherketone) (SPEEK), sulfonated poly(styrene-ran-ethylene) (SPSE), and composite materials such as zeolite/Nafion, $SiO_2$/Nafion, for example.

Additionally, the electrolyte may further include particles that help to reduce methanol crossover in a direct methanol fuel cell. In various embodiments, the electrolyte may include sulfonic acid-functionalized zeolite nanoparticles.

In one embodiment, the electrolyte include Nation and sulfonic acid-functionalized zeolite nanoparticles dispersed in ethanol solution.

The method further includes heating the electrolyte-infiltrated polyimide film to form the composite membrane. In various embodiments, heating includes heating the polyimide film in an oven at temperatures above about 50° C. The heating may be carried out in a single heating step or multiple heat steps, and each heating step of the multiple heating steps include heating at different temperatures for different periods of time.

As mentioned above, the present composite membrane may be used in a direct methanol fuel cell. Prior to the use, the thus-formed composite membrane may be treated to hydrogen peroxide solution and sulfuric acid solution.

In order that the invention may be readily understood and put into practical effect, particular embodiments will now be described by way of the following non-limiting examples.

EXAMPLES

Example 1

Preparation of Porous Polyimide (PI) Film

A poly(amic acid) solution of 18.0 wt. % co-polymer in N,N-dimethylformamide (DMF) was synthesized in a glass flask with a mechanical stirrer and nitrogen inlet and outlet. 1,4-phenylenediamine (PPDA) (99.9 wt. %, Sigma-Aldrich) and 4,4'-oxydianiline (ODA) (97.0 wt. %, Sigma-Aldrich) were completely dissolved in DMF, then benzophenone-3,3',4,4'-tetracarboxylic dianhydride (BTDA) (96.0 wt. %, Sigma-Aldrich) was added at a molar ratio of BTDA:PPDA:ODA (1:0.75:0.25). The reaction was carried out for 24 h at room temperature under a nitrogen atmosphere. A mixture of acetic anhydride and pyridine (volume ratio 2:1) was added slowly to the obtained poly(amic acid) and the resulting solution was held at room temperature for 24 h to obtain a polyimide precursor solution with a 16.0 wt. % solid content.

The porous PI film was fabricated by a wet phase inversion technique. First, the PI precursor was cast on glass plates by a spin coating machine (SCS G3, Cookson Electronics) at a speed of 900 rpm and a spin time of 30 s. Then, the casting film was coagulated immediately in a non-solvent bath at room temperature for 15 min to develop a porous structure, followed by ageing for 5 min in methanol and 5 min in water. The non-solvent solutions were mixtures of 1-butanol and DMF at various ratios. Finally, the porous PI film was dried in air for 12 h. The thickness of films can be easily controlled by varying the spin speed during the polymer casting.

Example 2

Preparation of Sulfonic Functionalized Zeolite Nanoparticles

For preparing phenethyl functionalized zeolite BEA (PEBEA) nanocrystals, 76.46 g of 35 wt. % aqueous tetraethylammonium hydroxide (TEAOH, Sigma-Aldrich) and 2.10 g of aluminium isopropoxide (98 wt %, Sigma-Aldrich) were mixed well in a 250 ml polypropylene (PP) bottle under a magnetic stir bar until the solution become clear. 100.50 g of aqueous 30 wt % colloidal silica (Ludox HS-30, $SiO_2/Na_2O$=90, $SiO_2$=29.90 wt %, $Na_2O$=0.34 wt %, Sigma-Aldrich) was then added. Finally, 0.58 g of phenethyl trimethoxysilane (PETMS, 98 wt %, Sigma-Aldrich) was added to complete the reaction mixture, and the bottle was sealed tightly. It was aged at room temperature (RT) for 2 h with strong stirring, and was then heated by a silicone oil bath at 100° C. with stirring for 15 days. The obtained solution was washed by three repetitions of centrifugation followed by decanting and re-dispersion in DDI $H_2O$ with ultrasonication. To prepare sulfonic acid PEBEA (SAPEBEA) nanocrystals, the washed PEBEA nanocrystals were dispersed in 96 wt % concentrated sulfuric acid ($H_2SO_4$) with vigorous stirring to obtain a 2.0 wt % zeolite suspension in sulfuric acid in a PP bottle. This solution was then held at 80° C. with stirring for 12 h to complete the reaction. Finally, the solution was washed by repeat centrifugation as described above until the solution became neutral and the washed SAPEBEA was re-dispersed in ethanol.

Example 3

Preparation of Composite Membrane

A filling polymer Nafion/ethanol suspension was prepared from commercial Nafion solution (5 wt. %, GasHub, Singapore). It was obtained by drying the commercial 5 wt. % Nafion solution at 60° C. until the solvent was evaporated completely. The dry Nafion was then treated with 25 wt. % nitric acid in water at 80° C. for 1 h, following by repeated rinsing with double deionized (DDI) water and further drying. After that, the Nafion was put into ethanol and ultrasonicated to facilitate re-dispersion. The formed Nafion/ethanol solution had a Nafion weight ratio of 5 wt. %. For the case of infiltration with Nafion/SAPEBEA dispersion of Example 2, the appropriate amounts of Nafion/ethanol and SAPEBEA/ethanol suspension were mixed together by ultrasonication for 30 min to obtain a mixture of the filling solution.

The porous PI substrate was extended over a round glass plate by a membrane caster. After that, the Nafion/ethanol solution was poured on the surface of the porous film. The glass plate was put in an oven at 60° C. for 24 h and then dried in a vacuum oven at 120° C. for 12 h and 150° C. for 1 h. After that, the obtained composite membrane was treated with a common pretreatment procedure using H2O2 and H2SO4 solutions.

Characterization of Porous Film and Composite Membrane
Fourier Transform Infrared (FT-IR)

The IR spectrum of the thin film was obtained by means of a FT-IR Spectrometer-PerkinElmer to identify the structure of the poly(amic acid), polyimide, and composite membrane.

Field-Emission Scanning Electron Microscope (FESEM)

The morphologies of the surfaces and cross-sections of the porous substrates and composite membranes were observed with a JEOL Field-Emission Electron Microscope (JSM-6700F). For cross-section observation, samples were fractured under cryogenic conditions using liquid nitrogen. All samples were coated with gold by an Auto Fine Coater before images were taken.

Substrate Porosity, Water Content, and Dimensional Stability

The substrate porosity, $\phi_p$ (vol. %), was estimated using the following relationship Eq. (1):

$$\phi_P = \left\{ 1 - \frac{w_{sub}}{\rho_{sub} \cdot V_{sub}} \right\} \times 100 \quad \text{Eq. (1)}$$

where $w_{sub}$, $\rho_{sub}$, and $V_{sub}$ are the weight, density and volume of the porous PI substrate, respectively.

Samples of the membranes were weighed ($w_1$) after immersion in DDI water at 80° C. for 24 h. Then samples were weighed ($w_2$) after drying in a vacuum oven at 80° C. for 24 h. The water content ($\Delta w$) was calculated as Eq. (2):

$$\Delta W (\%) = \frac{w_1 - w_2}{w_2} \times 100 \quad \text{Eq. (2)}$$

Dimensional stability was tested as follows. Membranes, each of around 2.5 cm in diameter were stored in a vacuum oven at 80° C. for 24 h and the dimension was measured before (L1) and after (L2) soaking in DDI water at 80° C. for 24 h. The dimensional change (ΔL) was calculated as Eq. (3):

$$\Delta L (\%) = \frac{L_2 - L_1}{L_1} \times 100 \quad \text{(3)}$$

Mechanical Strength Testing

Mechanical strength was determined with a testing machine (Instron 5543) according to the standard test method for tensile properties of thin plastic sheeting, i.e., ASTMD882-02. The samples were prepared in 5 mm width and 100 mm lengths with five test specimens for each membrane. The testing speed was 10 mm min$^{-1}$ and the initial gauge length was 50 mm.

Methanol Permeability and Proton Conductivity Measurement

The methanol permeability of the membranes was determined using the two-compartment diffusion cell technique. The proton conductivity of the membrane in the through-plane direction was measured using a potentiostat with a built-in frequency response analyzer (Autolab, Netherlands) in a home-made cell. The cell consisted of two Teflon blocks attached with a platinum foil electrode (1.2 cm×1.2 cm) and a platinum lead. The pretreated membrane (1.5 cm×1.5 cm) was sandwiched between these two Teflon blocks that were held in place with Teflon screws. The impedance measurements were carried out on fully hydrated membranes at different temperatures (room temperature (RT), 50° C., and 80° C.) over a frequency range of 250 to 150 kHz. The proton conductivity of the membrane was calculated according to the equation $\sigma = L/RS$, where $\sigma$, L, R, and S denote the ionic conductivity, the thickness of the membrane, the resistance of the membrane, and the surface area of the electrode, respectively.

Fuel Cell Testing

Single fuel cell performances tests were conducted with an Arbin fuel cell test station. To minimize influence from electrode variation, commercial electrodes (Gashub, Singapore) were used for the membrane electrode assembly (MEA) fabrication and performance test. The electrode consisted of a PTFE-treated (20 wt. %) carbon paper substrate, a microporous layer with a carbon loading of 1.2 mg cm$^{-2}$, and a catalyst layer. The catalyst layer in the anode contained 40 wt. % PtRu/C and Nafion, with a total metal loading of 2.0 mg cm$^{-2}$ (Pt:Ru=1:1), while that in the cathode contained 40 wt. % Pt/C and Nafion, with a Pt loading of 2.0 mg cm$^{-2}$. A MEA with an active electrode area of 5 cm$^2$ was obtained by pressing the cathode and anode on to each side of a pretreated Nafion 112 membrane or composite membrane at 140° C. and 2.0 MPa for 1 min (Hydraulic 3912, Carver, Inc.). The MEA was then assembled into a DMFC single-cell. The operation conditions were as follows: anode fuel 1.0 M or 5.0 M MeOH; flow rate, 1.0 mL min$^{-1}$; oxygen pressure, 0.4 MPa; flow rate, 0.25 L min$^{-1}$. The temperature of the cell was maintained at 70° C. All single-cell tests were conducted in triplicate, and the results presented here are the average data.

Results and Discussion

Figure 2:
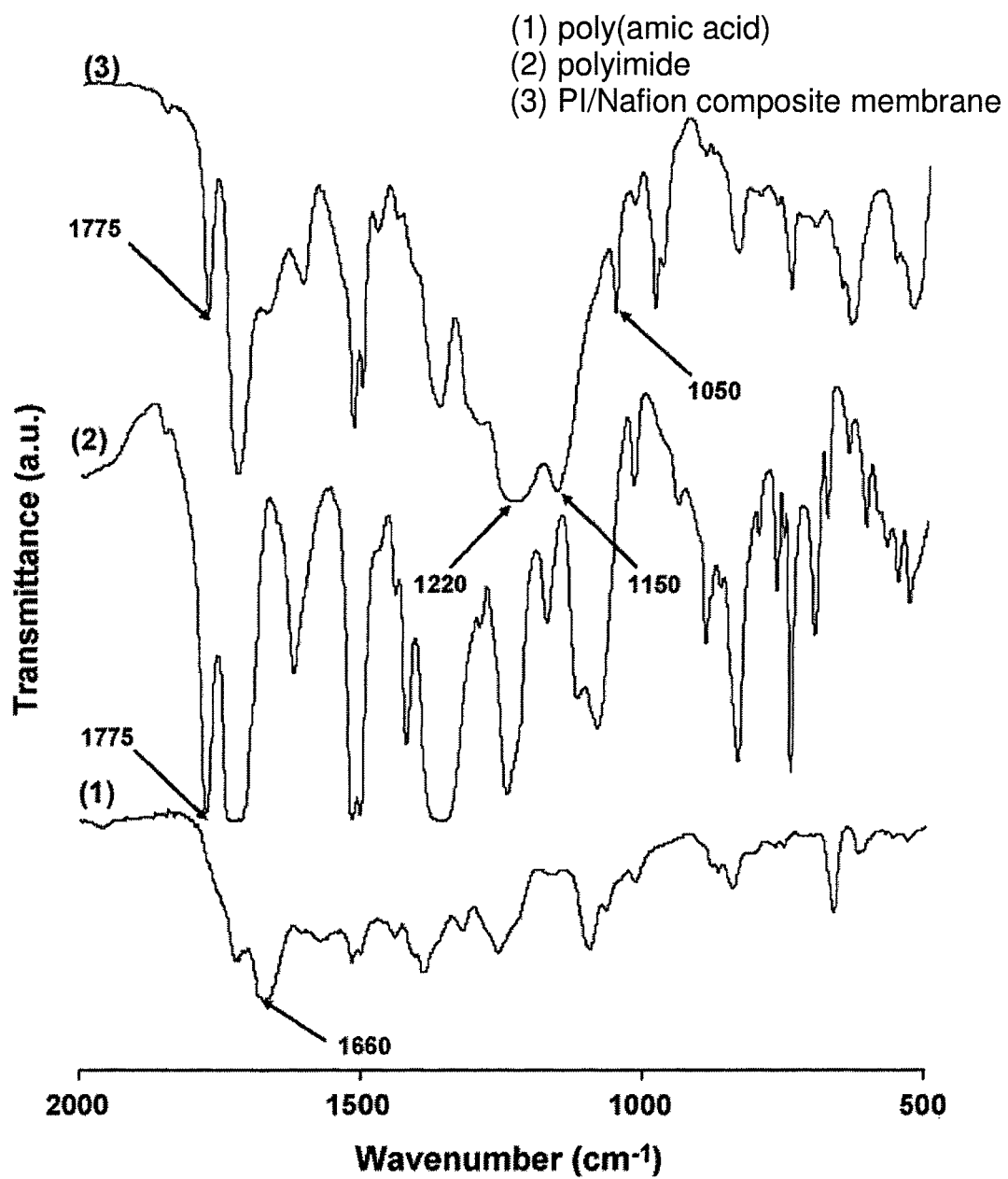
FIG. 2 shows FT-IR spectra of (1) poly(amic acid), (2) polyimide, and (3) PI/Nafion composite membrane.

Polyimide film of Example 1 is obtained by a two-step chemical imidization method, with the synthesis route shown in FIG. 1. In the first step, poly(amic acid) is formed from the reaction of aromatic dianhydride (BTDA) with aromatic diamine (PPDA and ODA). In the second step, the poly(amic acid) is chemically converted to a polyimide with the presence of acetic anhydride and pyridine. The structure of the polyimide was confirmed by FT-IR. As can be seen in FIG. 2, the major peaks at 1660 cm$^{-1}$ assigned to amide disappear completely after the chemical imidization. Instead, an imide ring absorption peak appears at 1775 cm$^{-1}$; it is attributed to stretching of the carbonyl group of imide. According to these FT-IR spectra results, it can be concluded that the chemical imidization process is completed by promoting agents at room temperature for 24 h, followed by vacuum heating at 150° C. for 1 h.

To function as a good matrix for a composite membrane, the porous PI film must have high porosity and remain mechanically strong and stiff at high porosity. Experimentally, the morphology of the porous film can be tuned by the solvent and non-solvent used during the pore-forming period. A low compatibility between solvent and non-solvent will cause a delayed de-mixing so that the resulted film will consist of a porous top layer and a sponge-type substructure. Alternatively, a high affinity between them will cause an instantaneous de-mixing so that the formed membrane will consist of a porous top layer and finger type substructure, commonly called macrovoids. Macrovoid-containing films are mechanically weak and easily lose their integrity under high pressure operation.

Figure 3:
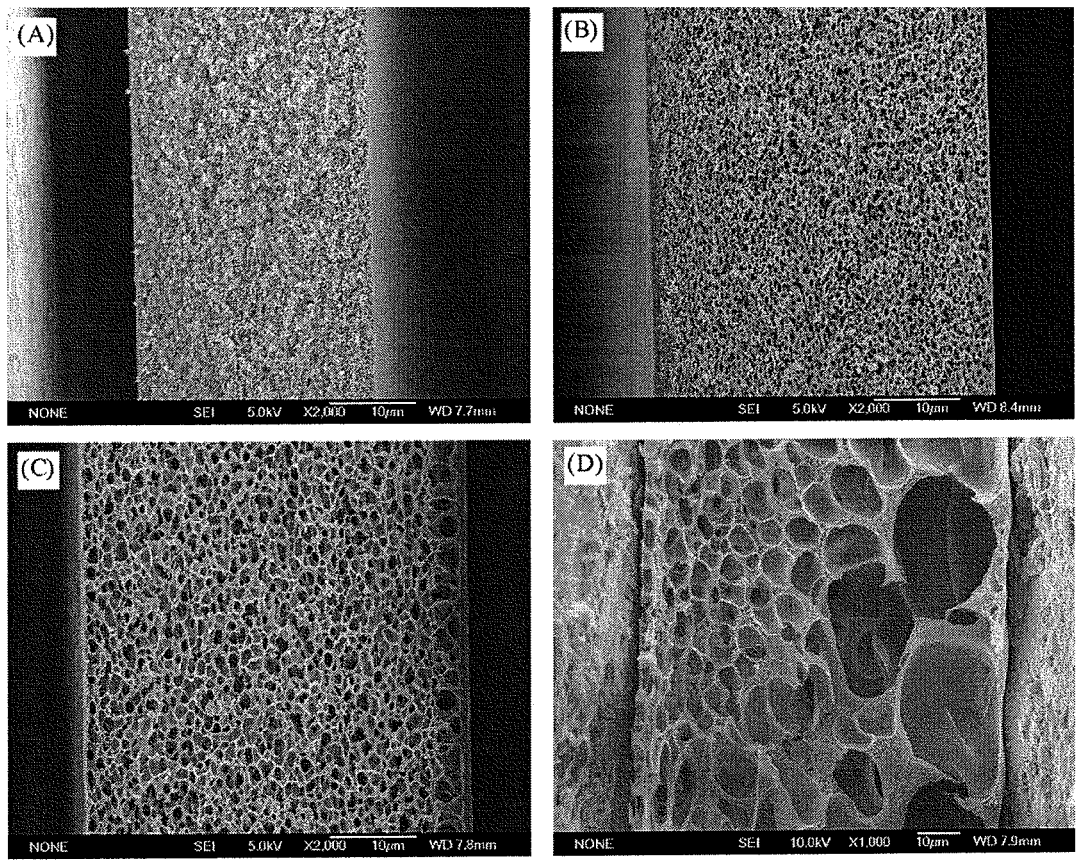
FIG. 3 shows FESEM images of cross-section of porous PI films prepared with different 1-butanol content in non-solvent bath with 1-butanol:DMF (vol. %:vol. %): (A) 80:20, (B) 70:30, (C) 60:40, and (D) 50:50.
Figure 4:
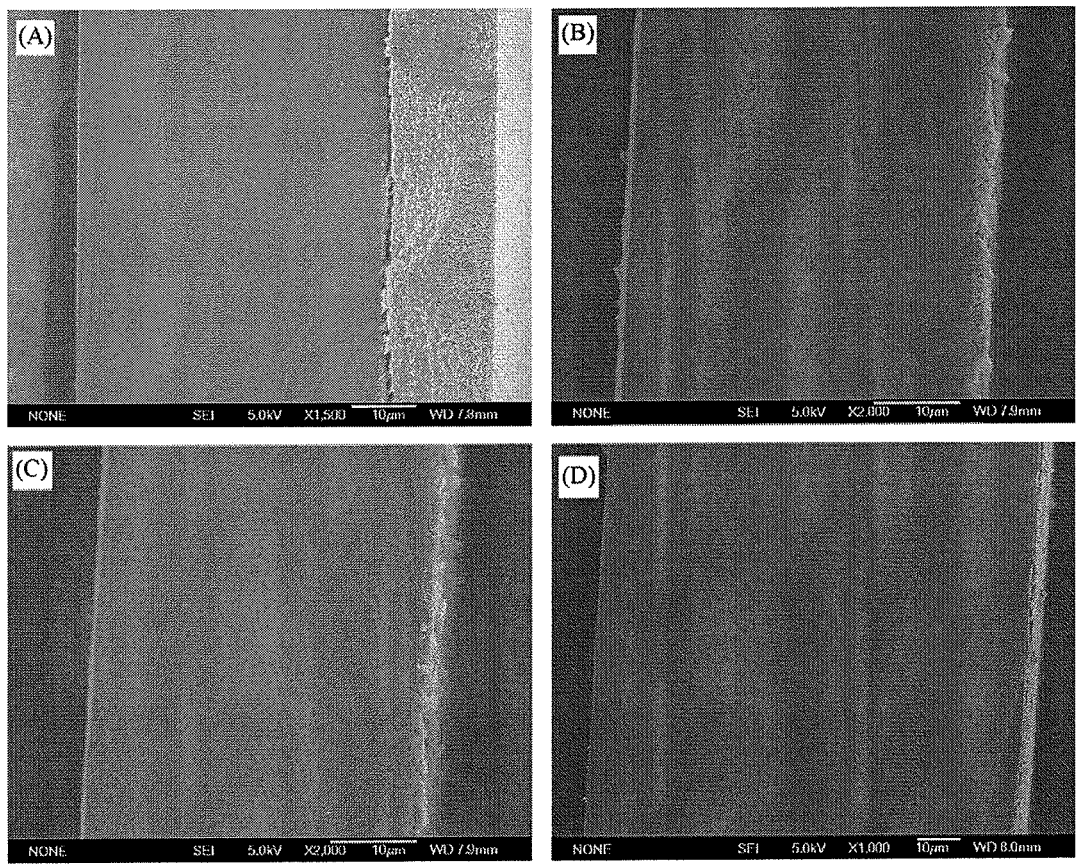
FIG. 4 shows FESEM images of cross-sections of PI/Nafion composite membranes based on porous PI films prepared with different 1-butanol content in non-solvent bath with 1-butanol:DMF (vol. %:vol. %): (A) 80:20, (B) 70:30, (C) 60:40, and (D) 50:50.
Figure 5:
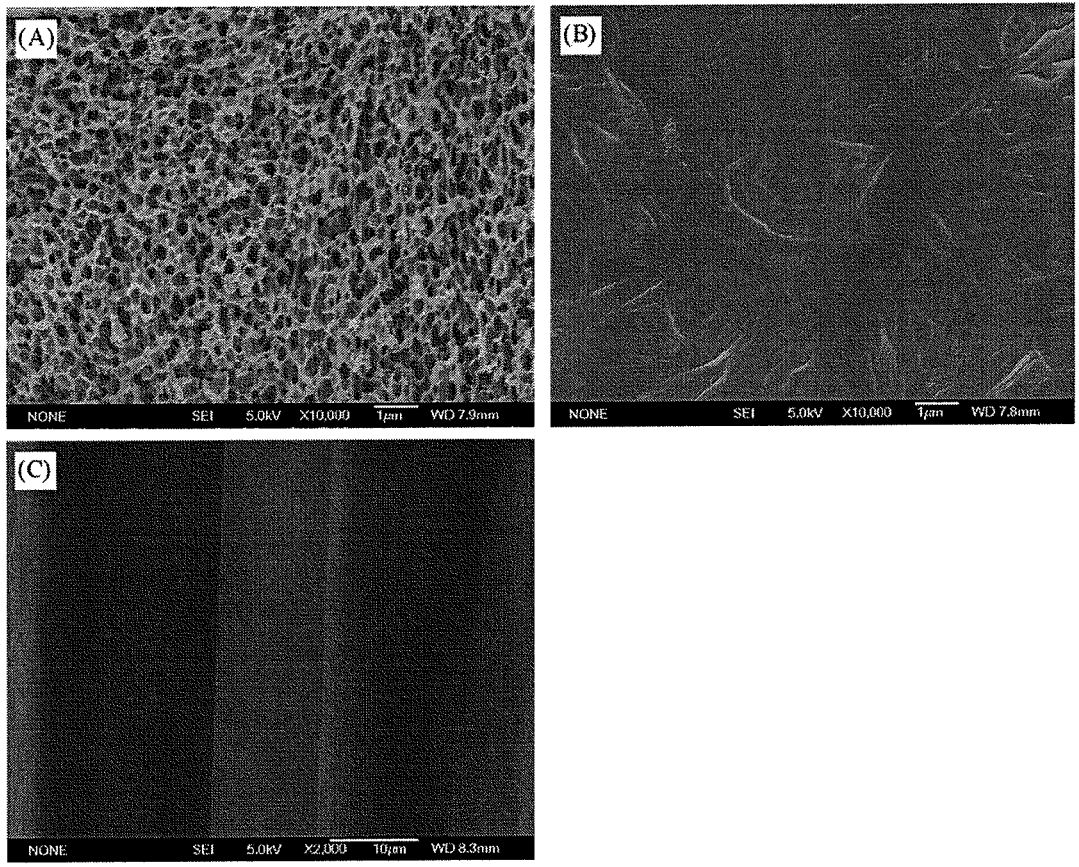
FIG. 5 shows FESEM images of (A) top surface of porous PI film prepared with 1-butanol:DMF=70 vol. %:30 vol. %, (B) top surface of PI/Nafion composite membrane, and (C) cross-section of non-porous PI film.

Since preliminary results showed that a sponge-type structure possesses higher mechanical strength than a finger-type at high porosity, DMF was selected as the solvent and 1-butanol as the non-solvent to develop such sponge type structure. Here the pore size can be controlled by changing the solvent/non-solvent ratio, as shown in FIG. 3. The pore size of porous films increases with decrease of the 1-butanol content in a coagulation bath. The pores can grow until the matrix phase, polymer-rich phase, is solidified. With lower 1-butanol contents, the polymer concentration of the polymer-rich phase is lower. Therefore, there is a longer time before the membrane solidifies and larger pores can develop. To fabricate successfully a pore-filling composite membrane with a high performance, the porous PI matrix preferentially should have pore sizes on the sub-micrometer scale, or less, to suppress efficiently membrane swelling and maintain high mechanical strength. If the pores are too large the blocking of methanol crossover will be less efficient and the mechanical strength of the substrate will usually be lower. If the pores are too small, however, infiltration can be difficult, as can be seen in FIG. 4, where a separate Nafion layer is formed at a 1-butanol:DMF ratio of 80 vol. %:20 vol. %, whereas a composite membrane is successfully prepared from porous matrixes at a 1-butanol:DMF ratio (vol. %:vol. %) of 70:30, 60:40, and 50:50. Therefore, the porous matrix with the smallest size while still allowing complete Nafion infiltration i.e., synthesized at a 1-butanol:DMF ratio of 70 vol. %:30 vol. %, is chosen as the porous matrix to fabricate and characterize the composite membrane. As shown in FIGS. 3B and 5A, the substrate exhibits a highly porous structure that contains a sponge-type sub-layer with a pore size of ~0.3 µm and a top porous surface. The thickness of the porous film is increased as many as five times compared with a non-porous film (40 µm vs. 8 µm), from which the porosity of the porous PI film is estimated at ~80 vol. %. This result is also in agreement with the measured porosity based on Eq. (1). The overall porosity of a porous PI film can be easily controlled by the polymer content of the casting solution, as well as by the relative rates at which non-solvent enters and solvent leaves the casting solution. Moreover, from a thermodynamic standpoint, any additive in the casting solution will be expected to increase the rate of non-solvent entry and decrease the rate of solvent removal, which favours the formation of a film with high porosity. Therefore, the presence of the acetic anhydride and pyridine in the polyimide precursor as additives further increases the film porosity.

Other than the pore size effect, for a polymer electrolyte to successfully fill the pores of a host substrate, the viscosity and contact angle on the host substrate of the polymer solution must be low. To facilitate Nafion filling, commercial 5 wt. % Nafion was re-dispersed in ethanol to reduce the viscosity and the contact angle with the porous PI film. In addition, a wet porous PI film was used as it has high affinity towards the filling polymer because of the presence of residual acetic anhydride in the matrix that makes the wet porous film more hydrophilic. During the process of filling Nafion into the pores of the porous substrate, the gravity force dragged Nafion solution into the wetted pores of the porous PI film and after evaporating the solvent, Nafion can completely plug the pores. This use of a wet porous PI film is found to be critical to the formation of a composite membrane. If the porous polyimide is completely dried, with all the residual acetic anhydride in the small pores removed, pores will be observed in the composite membrane even if the porous PI is treated again with acetic anhydride before Nafion infiltration. It is believed that, when the fully dried porous substrate is subject to this post-treatment with acetic anhydride, air will usually be trapped in some of the small pores and make them inaccessible to acetic anhydride. Subsequently, the Nafion ionomer will not be able to infiltrate these unwetted pores. Work on the porous substrate synthesis used thermal imidization has been reported. It involved drying of the porous PI substrate at high temperature, and this explained why Nafion cannot fully fill all the pores in that structure. Instead, as shown in FIG. 4B, no pore is observed for the composite membrane fabricated with the wet porous PI film and the filling polymer. A smooth morphology is also observed on the top surface (FIG. 5B), indicating that Nafion is distributed uniformly in the composite membrane. In addition, the FT-IR spectra PI/Nafion composite membrane (FIG. 2) shows an absorption peak at 1775 cm$^{-1}$, indicating the presence of PI in the composite membrane. In the range 1400 to 1100 cm$^{-1}$, two very strong vibration bands are present. The band at 1150 cm$^{-1}$ is due to symmetric C—F stretching, while the band at 1220 cm$^{-1}$ is attributed to asymmetric C—F stretching. Moreover, a band at 1050 cm$^{-1}$ attributed to S—O stretching of the $SO_3$ group of Nafion structure can also be identified.

The mechanical strength of membranes affects the manufacturing condition and durability of the MEA. Higher mechanical strength allows fabrication of thinner membranes with smaller resistance. The porous PI film in this example is BTDA-PPDA/ODA copolyimide with a combination of a flexible ODA monomeric unit and a rigid PPDA monomer. It is reported that the ultimate strength and tensile modulus of copolyimide is greater than those of the reference polyimides of BTDA-PPDA and BTDA-ODA. As shown in Table 1, the composite membrane possesses much higher mechanical strength compared with the Nafion 112 membrane (104.5 MPa vs. 26.4 MPa), because of the reinforcing effect of the strong porous PI matrix.

The dimensional stability of the membrane is an important property for practical operation of a fuel cell. Since carbon electrodes do not swell and change in dimension from any water uptake, less damage to the structure integrity of the MEA and improved durability can be expected for those membranes with smaller changes in dimension. Table 1 shows a comparison of the PI/Nafion composite membrane and Nafion 112 membrane. After being soaked in water at 80° C. for 24 h, the PI/Nafion composite membrane Experiences a much lower dimensional change (about ⅓ of Nafion 112) and water uptake (about ⅓ of Nafion 112). It can be concluded that the strong PI matrix in the composite membrane can effectively suppress the membrane from swelling and prevent the membrane from absorbing excess water, although the volumetric ratio of PI is only 20 vol. %. Methanol crossover usually occurs in the hydrophilic region of the Nafion polymer, which expands with the adsorption of more water. The suppressed water adsorption or less dimensional change in the membrane indicates less expansion of the hydrophilic portion (smaller methanol passage).

On the other hand, it is concluded that, in the pore-filling electrolyte membrane, the host matrix is totally inert to methanol and that methanol crossover is mainly through the polymer electrolyte filler, or more specifically, the hydrophilic portion of the Nafion. The fact that the composite membrane mechanically prevents Nafion from swelling is expected to lower the methanol crossover. Indeed, as shown in Table 2, the measured methanol permeability of the composite membrane is ~80 times lower than that of the Nafion 112 membrane ($2.76 \times 10^{-6}$ cm$^2$ s$^{-1}$ vs. $3.36 \times 10^{-8}$ cm$^2$ s$^{-1}$), although 80 vol. % of the membrane is still Nafion polymer.

Two types of conductivity measurements have been reported, namely, in-plane and through-plane measurements. The in-plane conductivity measurements are known to be relatively insensitive to the contact resistance at the current carrying electrodes, but do not reflect the real conductivity of ionic motion through a membrane in a fuel cell. When the membrane is isotropic, the difference between the in-plane and the through-plane conductivity will be small. When the membrane is anisotropic, however, such as multilayer membranes, or composite membranes as in this example, the difference is expected to be large and the through-plane one is more representative.

In this study, the through-plane conductivity for fully hydrated membranes is determined at various temperatures. As shown in Table 2, the proton conductivity of the membranes increases with increase in temperature as a result of higher proton mobility at higher temperature. At room temperature, the proton conductivity of the PI/Nafion composite membrane is only slightly lower than the Nafion 112 membrane (0.056 S cm$^{-1}$ vs. 0.059 S cm$^{-1}$). The high porosity of the PI support matrix (80 vol. %) minimizes the adverse effect of the non-conducting PI on the conductivity of the resulting PI/Nafion composite membrane. Given that the thinner composite membrane is used as a result of the improved mechanical strength, the overall membrane resistance of the PI/Nafion composite membrane is actually smaller than that of the Nafion 112 (0.082 Ωcm$^2$ vs. 0.108 Ωcm$^2$). The data in Table 2 also show the selectivity factor (φ), a commonly used quantity to describe a membrane the performance of in a DMFC, and that is defined as the ratio between the proton conductivity and the methanol permeability. The selectivity (φ) of the composite membrane is significantly higher than that of the Nafion 112 membrane ($1.67 \times 10^6$ S s cm$^{-3}$ vs. $2.14 \times 10^4$ S s cm$^{-3}$).

Figure 6:
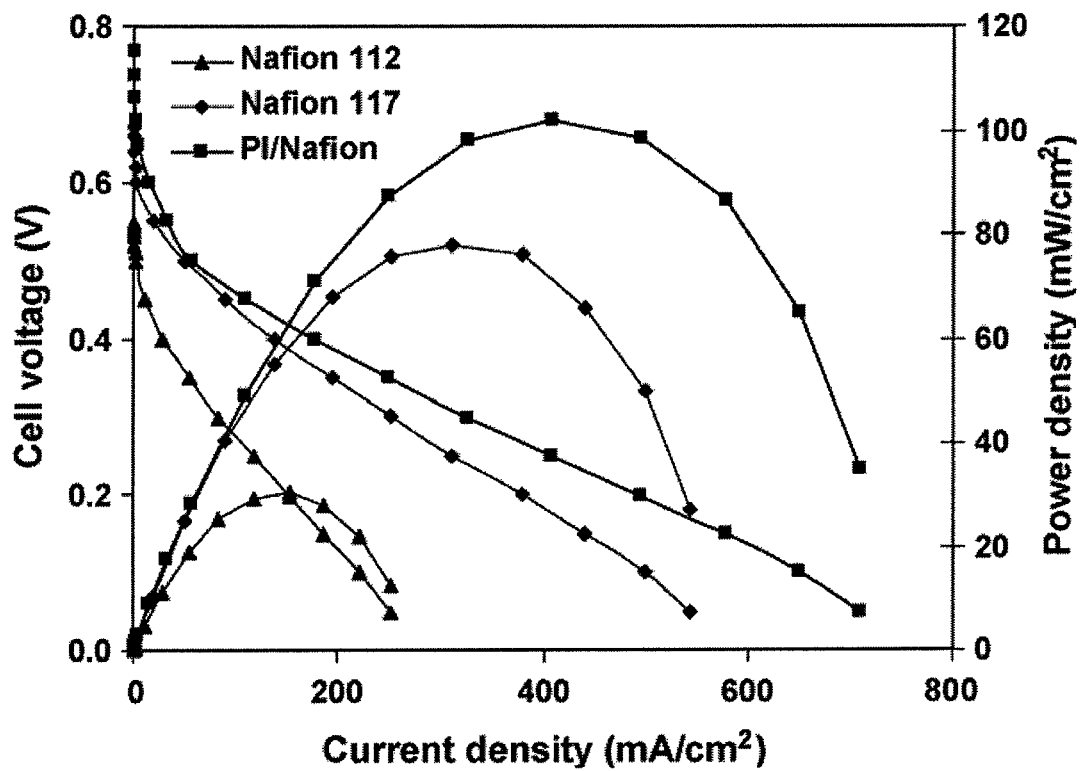
FIG. 6 shows a direct methanol fuel cell (DMFC) single-cell performance of PI/Nafion composite membrane, Nafion 112, and Nafion 117 at 70° C. with 1 M methanol.
Figure 7:
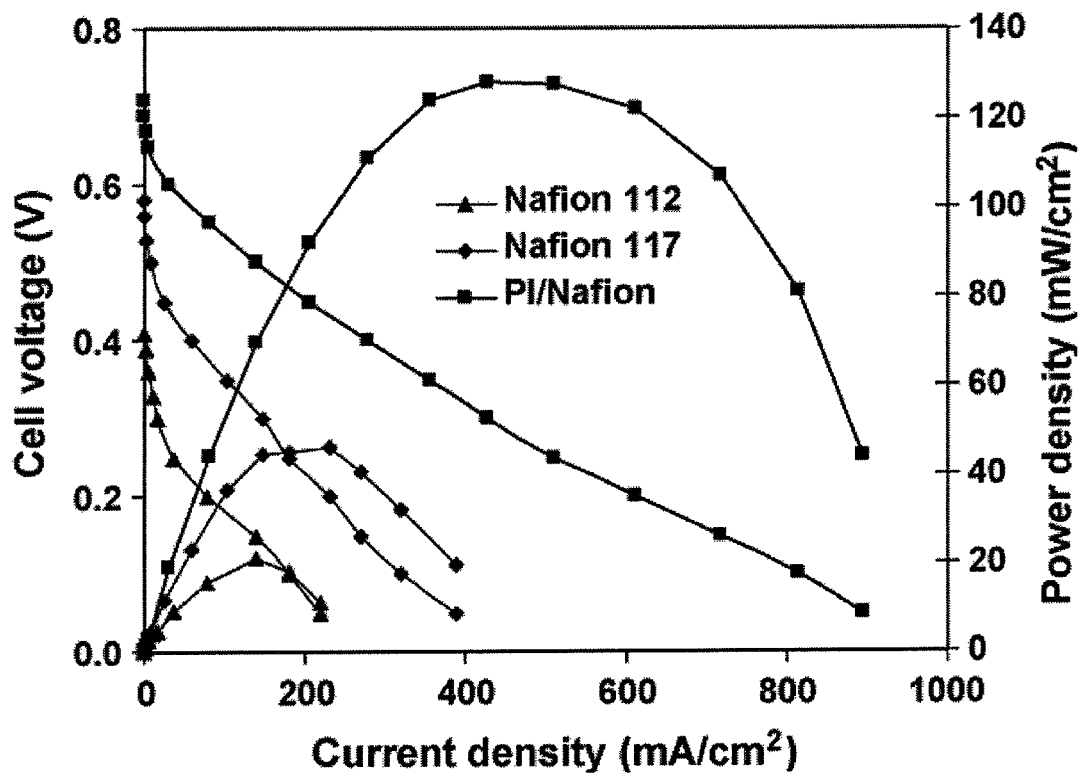
FIG. 7 shows a DMFC single-cell performance of PI/Nafion composite membrane, Nafion 112, and Nafion 117 at 70° C. with 5 M methanol.
Figure 8:
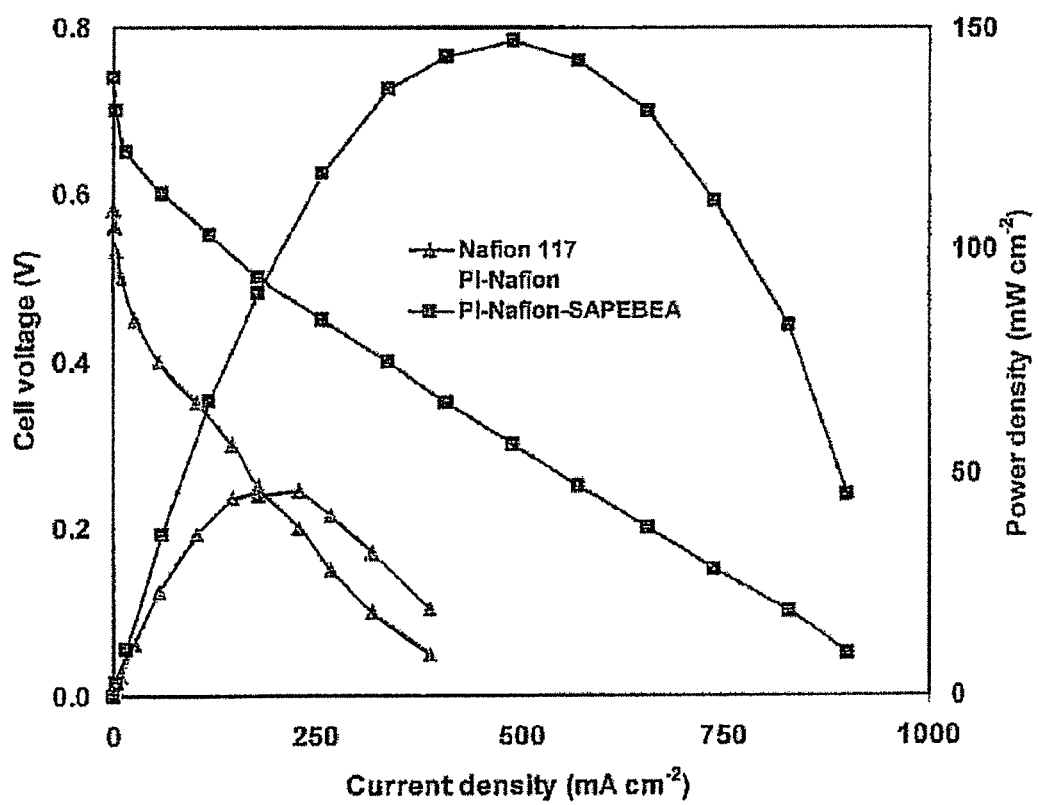
FIG. 8 shows a DMFC single-cell performance of PI-Nafion-SAPEBEA composite membrane with 5 wt % SAPEBEA to Nafion, PI-Nafion composite membrane, and Nafion 117 at 70° C. with 5 M methanol.

The single-cell performance of the MEAs based on the commercial Nafion 112, 117 and PI/Nafion composite membrane using 1M methanol is presented in FIG. 6. As expected, the MEA with the PI/Nafion composite membrane shows considerably higher performance in comparison with those using a Nafion 112 or a 117 membrane, because of its lower membrane resistance and reduced methanol crossover. Particularly, the PI/Nafion membrane shows much higher open-circuit voltage (OCV) than Nafion 117 and 112 (0.77 V vs. 0.67 V and 0.55 V), although the composite membrane has a smaller thickness. The OCV of a MEA is closely related to the methanol crossover, i.e., higher methanol crossover leads to a lower OCV. The higher OCV for the PI/Nafion membrane then confirms that the PI/Nafion composite membrane in the MEA suppresses methanol crossover. This finding is consistent with the ex-situ methanol permeability measurement. The advantage of significantly reduced methanol crossover with the composite membrane can be clearly seen from the performance test when feeding 5 M methanol (FIG. 7). A high fuel concentration is preferred from an application point of view, as it indicates higher specific energy from the power source. At such a high concentration, the maximum power density of the MEA with the pure Nafion 112 and 117 membrane is only 21 mW cm$^{-2}$ and 40 mW cm$^{-2}$, while the maximum power density of the MEA with the PI/Nafion composite membrane still reaches 128 mW cm$^{-2}$ and the OCV of the composite membrane is much higher than Nafion 117 and 112 (0.71 V vs. 0.58 V and 0.41 V).

CONCLUSION

A highly porous PI film with a tunable pore size, thickness and porosity has been synthesized by means of a wet phase inversion process. With a pore size of around 0.3 μm and a porosity of 80 vol. %, this porous sponge-type PI film is used as a support matrix for the fabrication of a novel PI/Nafion composite membrane by infiltration of Nafion in all the pores. A very efficient way for an easy and complete infiltration of the proton-conducting polymer into this matrix has been found. It is realized by using a wet porous PI film with the presence of residual acetic anhydride. The PI/Nafion composite membrane has excellent properties compared with a Nafion 112 membrane, such as three times lower in dimensional change, four times higher in mechanical strength, eighty times lower in methanol crossover, and significantly higher in selectivity factor. The improved performance of a DMFC with PI/Nafion composite membrane is also demonstrated. Allowing the use of a very thin membrane and a high methanol concentration, the PI/Nafion composite membrane is very promising as a proton-exchange membrane for DMFCs. Not limited to Nafion, this approach can be extended to other proton conductors, for which even higher proton conductivity can be expected.

TABLE 1

Physical properties of membranes.

| Membrane | Thickness (μm) | Water content (%) | Dimensional change (%) | Mechanical strength (Mpa) |
|---|---|---|---|---|
| Nafion 112 | 64 | 15.67 | 11.85 | 26.4 |
| PI/Nafion composite | 46 | 5.92 | 4.75 | 104.5 |

TABLE 2

Proton conductivity and methanol permeability of membranes.

| Membrane | Proton conductivity σ (S cm$^{-1}$) | | | Methanol permeability (RT) P (cm$^2$ s$^{-1}$) | Selectivity (RT) Φ = σ/P (S s cm$^{-3}$) |
|---|---|---|---|---|---|
| | RT | 50° C. | 80° C. | | |
| Nafion 112 | 0.059 | 0.071 | 0.079 | 2.76 × 10$^{-6}$ | 2.14 × 10$^4$ |
| PI/Nafion composite | 0.056 | 0.068 | 0.077 | 3.36 × 10$^{-8}$ | 1.67 × 10$^6$ |
| PI-95 wt. % Nafion-5 wt. % SAPEBEA | 0.062 | | | 1.15 × 10$^{-8}$ | 5.39 × 10$^6$ |

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

By "about" in relation to a given numerical value, such as for temperature and period of time, it is meant to include numerical values within 10% of the specified value.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

The invention claimed is:

1. A method for preparing a porous polyimide film, the method consisting of:
   (a) reacting an aromatic dianhydride with two different aromatic diamines in a suitable solvent to form a poly(amic acid), wherein the aromatic dianhydride comprises benzophenone-3,3',4,4'-tetracarboxylic dianhydride (BTDA) and the two different aromatic diamines comprise 1,4-phenylenediamine (PPDA) and 4,4'-oxydianiline (ODA), wherein the molar ratio of BTDA to PPDA to ODA is about 1.0:0.75:0.25;
   (b) adding a dehydrated agent of an acid anhydride and an organic base to the reaction mixture to convert the poly(amic acid) to a polyimide precursor;
   (c) casting the reaction mixture of (b) comprising the polyimide precursor onto a solid support to form a film;
   (d) coagulating the polyimide precursor in a coagulating bath comprising a mixture of a solvent and a non-solvent to develop a porous structure; and
   (e) ageing the coagulated polyimide precursor in one or two ageing solutions; and
   (f) drying the aged polyimide precursor in air to convert the aged polyimide precursor to the porous polyimide film,
   wherein the polyimide comprises the chemical formula

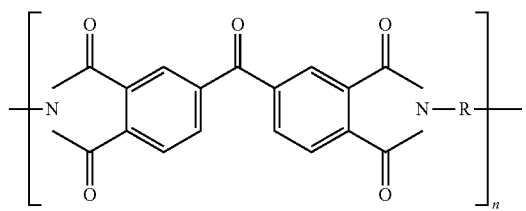

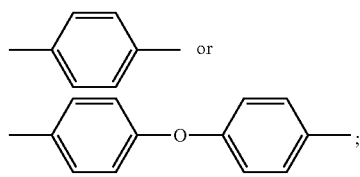

and n is an integer of at least 20.

2. The method of claim 1, wherein the solvent of the coagulating bath is selected from the group consisting of N,N-dimethylformamide (DMF), tetrahydrofuran, acetone, N-methylpyrrolidone (NMP), N,N-dimethylacetamide, and dimethylsulfoxide.

3. The method of claim 2, wherein the solvent is DMF or NMP.

4. The method of claim 1, wherein the non-solvent of the coagulating bath is a substituted or unsubstituted straight-chain or branched $C_1$-$C_{10}$ alcohol.

5. The method of claim 4, wherein the non-solvent is 1-butanol.

6. The method of claim 1, wherein the volume ratio of non-solvent: solvent is between about 5:1 and about 1:1.

7. The method of claim 6, wherein the volume ratio of non-solvent:solvent is about 7:3.

8. The method of claim 1, wherein the dehydrated agent of the acid anhydride is acetic, propanoic, n-butyric or benzoic acid anhydride.

9. The method of claim 1, wherein the organic base is pyridine, triethylamine, or N-methylmorpholine.

10. The method of claim 1, wherein the dehydrated agent is acetic anhydride and the organic base is pyridine.

11. The method of claim 10, wherein the acetic anhydride and the pyridine are present in a volume ratio of acetic anhydride:pyridine of between about 5:1 and about 1:1.

12. The method of claim 11, wherein the volume ratio of acetic anhydride:pyridine is about 2:1.

13. The method of claim 1, wherein a first ageing solution is methanol and a second ageing solution is water.

14. The method of claim 1, wherein drying comprises drying the aged polyimide precursor in air for more than 1 hour.

15. The method of claim 14, wherein drying comprises drying in air for about 12 hours.

* * * * *